(12) United States Patent
Um et al.

(10) Patent No.: US 9,786,238 B2
(45) Date of Patent: Oct. 10, 2017

(54) ARRAY SUBSTRATE, DISPLAY DEVICE, AND METHOD FOR DRIVING DISPLAY DEVICE

(71) Applicant: BOE TECHNOLOGY GROUP CO., LTD., Beijing (CN)

(72) Inventors: Yoonsung Um, Beijing (CN); Heecheol Kim, Beijing (CN); Yunsik Im, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 207 days.

(21) Appl. No.: 14/354,952

(22) PCT Filed: Dec. 27, 2013

(86) PCT No.: PCT/CN2013/090780
§ 371 (c)(1),
(2) Date: Apr. 29, 2014

(87) PCT Pub. No.: WO2015/018168
PCT Pub. Date: Feb. 12, 2015

(65) Prior Publication Data
US 2016/0018693 A1    Jan. 21, 2016

(30) Foreign Application Priority Data

Aug. 8, 2013  (CN) .......................... 2013 1 0344394

(51) Int. Cl.
*G09G 3/36*       (2006.01)
*G02F 1/1343*   (2006.01)
(Continued)

(52) U.S. Cl.
CPC ....... *G09G 3/3655* (2013.01); *G02F 1/13452* (2013.01); *G02F 1/133345* (2013.01);
(Continued)

(58) Field of Classification Search
CPC ...... G09G 3/36; G09G 3/3611; G09G 3/3614; G09G 3/3648; G09G 3/3655;
(Continued)

(56) References Cited

U.S. PATENT DOCUMENTS 6,376,270 B1 * 4/2002 Gu ...................... H01S 5/18341
                                                                    372/50.11
8,456,398 B2    6/2013  Ito et al.
(Continued)

FOREIGN PATENT DOCUMENTS

CN         1184261 A1      6/1998
CN       101211084 A      7/2007
(Continued)

OTHER PUBLICATIONS

Chinese Second Office Action dated Nov. 4, 2015, Application No. 201310344394.8, 8 Pages.
(Continued)

*Primary Examiner* — David Tung
(74) *Attorney, Agent, or Firm* — Brooks Kushman P.C.

(57) ABSTRACT

According to the array substrate provided by this disclosure, in a row of sub-pixels, sub-pixels in the odd columns and even columns are separately coupled to different gate lines, i.e., making the sub-pixels coupled to the same gate line are not adjacent to each other. In this way, during row scanning drive, an up-down twist charging may be implemented, and the sub-pixels cause no interference to each other.

15 Claims, 3 Drawing Sheets

(51) Int. Cl.
  *G02F 1/1345* (2006.01)
  *G02F 1/1333* (2006.01)
  *G02F 1/1362* (2006.01)

(52) U.S. Cl.
  CPC .. *G02F 1/134309* (2013.01); *G02F 1/136286* (2013.01); *G09G 3/3614* (2013.01); *G09G 3/3677* (2013.01); *G09G 3/3688* (2013.01); *G02F 2001/134345* (2013.01); *G09G 2300/0426* (2013.01); *G09G 2300/08* (2013.01); *G09G 2310/0213* (2013.01); *G09G 2310/0221* (2013.01); *G09G 2320/0204* (2013.01); *G09G 2320/0209* (2013.01)

(58) Field of Classification Search
  CPC ... G09G 2300/0421; G09G 2300/0426; G09G 2300/0434; G09G 2300/0429; G09G 2300/0465; G09G 2300/08
  See application file for complete search history.

(56) References Cited

U.S. PATENT DOCUMENTS

| | | | |
|---|---|---|---|
| 8,670,098 | B2 | 3/2014 | Park et al. |
| 2010/0103086 | A1 | 4/2010 | Yan et al. |
| 2010/0207861 | A1 | 8/2010 | Chang et al. |
| 2012/0081626 | A1* | 4/2012 | Itoh ................... G02F 1/136259 349/33 |
| 2012/0249943 | A1* | 10/2012 | Pai ..................... G02F 1/134363 349/141 |

FOREIGN PATENT DOCUMENTS

| | | |
|---|---|---|
| CN | 101551562 A | 10/2009 |
| CN | 101726892 A | 6/2010 |
| CN | 102208177 A | 10/2011 |
| CN | 102237355 A | 11/2011 |
| CN | 103293732 A | 9/2013 |
| CN | 103399440 A | 11/2013 |
| EP | 0838801 A1 | 4/1998 |
| JP | 05134629 A | 5/1993 |

OTHER PUBLICATIONS

Chinese First Office Action dated May 5, 2015, Application No. 201310344394.8, 8 Pages.
PCT International Search Report and Written Opinion dated May 13, 2014, Application No. PCT/CN2013/090780, 15 Pages.

* cited by examiner

-PRIOR ART-

| N-1ᵗʰ FRAME | Nᵗʰ FRAME | N+1ᵗʰ FRAME | N+2ᵗʰ FRAME |
|---|---|---|---|
| + - + -<br>- + - +<br>+ - + -<br>- + - + | - + - +<br>+ - + -<br>- + - +<br>+ - + - | + - + -<br>- + - +<br>+ - + -<br>- + - + | - + - +<br>+ - + -<br>- + - +<br>+ - + - |

FIG. 4

ARRAY SUBSTRATE, DISPLAY DEVICE, AND METHOD FOR DRIVING DISPLAY DEVICE

CROSS-REFERENCE TO RELATED APPLICATION

This application is the U.S. national phase of PCT Application No. PCT/CN2013/090780 filed on Dec. 27, 2013, which claims priority to Chinese Patent Application No. 201310344394.8 filed on Aug. 8, 2013, the disclosures of which are incorporated in their entirety by reference herein.

BACKGROUND OF THE INVENTION

Field of the Invention

This disclosure relates to the field of display technologies, and in particular, to an array substrate, a display device, and a method for driving the display device.

Description of the Prior Art

A thin film transistor-liquid crystal display (TFT-LCD), which has advantages of stable image, image fidelity, radiation annihilation, and space and energy saving, is widely applied to electronic products such as television sets, mobile phones, and computer monitors. At present, TFT-LCDs are leading in the flat-panel display field.

A basic image display unit of a liquid crystal display panel is sub-pixel. The sub-pixel may create a capacitance effect in the structure of the liquid crystal display panel. As long as sufficient drive voltages are applied between two ends of the capacitor, image may be displayed. The voltages applied to the two ends of the capacitor are respectively a common voltage and a data voltage. Therefore, if no positive-negative polarity inversion is conducted for the voltages applied to the two ends of the capacitor, sub-pixels for image display are long-term charged by a DC voltage having the same polarity, and thus a specific amount of charges may be accumulated on a liquid crystal alignment layer and a liquid crystal layer between common electrodes and pixel electrodes, as illustrated in FIG. 1. In this way, the sub-pixel has a poor display effect. Even worse, liquid crystal polarization may be caused and consequently the sub-pixel may fail. The failure of this sub-pixel to the least extent may cause an afterimage, i.e., background color on the display image, on the liquid crystal display panel, and color contrast may be degraded. Therefore, the voltages applied to the two ends of the capacitor need to be subject to polarity inversion at intervals of a specific time period.

In the prior art, polarity inversion driving methods mainly comprise frame inversion, row inversion, point inversion and the like. For example, in the $N-1^{th}$ frame, all sub-pixels have a positive polarity; in the $N^{th}$ frame, all sub-pixels have a negative polarity; and in the $N+1^{th}$ frame, all sub-pixels have a positive polarity, and so on. This is referred to as the frame inversion driving method. Still for example, as illustrated in FIG. 2, in the $N-1^{th}$ frame, all sub-pixels in odd rows have a positive polarity and all sub-pixels in even rows have a negative polarity; in the $N^{th}$ frame, all sub-pixels in odd rows have a negative polarity and all sub-pixels in even rows have a positive polarity; and in the $N+1^{th}$ frame, all sub-pixels in the odd rows have a positive polarity and all sub-pixels in the even rows have a negative polarity, and so on. This is referred to as the row inversion driving method. Yet still for example, in a frame, polarities of any two adjacent sub-pixels are inversed, which is referred to as the point inversion driving method. In the frame inversion driving method, the drive voltages are too great, the power consumption is high, and the flicker phenomenon is severe; whereas in the point inversion driving method, the circuit is too complicated and the driving control is relatively troublesome. Therefore, the row inversion driving method having smaller driving voltages and lower power consumption is widely applied.

In the prior art, the row inversion driving method is generally implemented by inversing a common voltage of each row of sub-pixels, i.e., keeping the polarity of the data voltage unchanged. However, the common voltage is subject to alternate polarity changes, and therefore the data voltage is subject to positive-negative alternate changes with respect to the common voltage. Nevertheless, since the data voltage and the common voltage applied to adjacent sub-pixels in the same row have the same polarity and the adjacent sub-pixels are very close to each other, mutual impacts may be caused between the adjacent sub-pixels, and crosstalk may occur, thereby resulting in the Mura phenomenon and affecting the image display effects.

SUMMARY OF THE INVENTION

I. Technical Problem to be Solved

This disclosure is directed to providing an array substrate capable of reducing or eliminating Mura in the row inversion driving method, a display device having the array substrate, and a method for driving the display device, thereby improving display effects of the display device, and enhancing user experience.

II. Technical Solutions

This disclosure employs the following technical solutions:

An array substrate may comprise a plurality of rows of sub-pixels and gate lines arranged on two sides of each of the plurality of rows of sub-pixels; wherein with respect to any of the plurality of rows of sub-pixels, sub-pixels in odd columns are all coupled to the gate line on one side of the row of sub-pixels, and sub-pixels in even columns are all coupled to the gate line on the other side of the row of sub-pixels; and with respect to any two adjacent rows of sub-pixels, sub-pixels in the same column are coupled to different gate lines.

Preferably, the array substrate may further comprise common electrode lines arranged corresponding to each row of gate lines, wherein common electrodes of sub-pixels that are coupled to the same row of gate lines are serially connected and then coupled to the common electrode line corresponding to the row of gate line.

Preferably, the sub-pixels may further comprise pixel electrodes that are arranged on a layer different from the layer where the common electrodes are arranged; an insulation layer may be arranged between the pixel electrodes and the common electrodes; and the insulation layer may have a thickness of greater than 0.75 μm and less than 2 μm.

Preferably, the insulation layer may have a thickness of 1.4 μm to 1.6 μm.

Preferably, at least one of the common electrode and the pixel electrode may be a comb electrode.

This disclosure further provides a display device comprising the above-described array substrate.

Preferably, the display device may further comprise a drive device coupled to the array substrate; the array substrate may further comprise: common electrode lines arranged corresponding to each row of gate lines; and data lines arranged on two sides of each column of sub-pixels; wherein the drive device may comprise:

a gate electrode driver, coupled to the gate lines and configured to sequentially load a scan signal to each row of gate lines;

a source electrode driver, coupled to the data lines and configured to load a data signal to the data lines; and a common electrode driver, coupled to the common electrode lines and configured to sequentially load a common voltage to the common electrode lines arranged corresponding to each row of gate lines.

This disclosure further provides a method for driving the above-described display device, comprising:

loading sequentially a scan signal to each of a plurality of rows of gate lines, so as to scan sub-pixels coupled to each of the plurality of rows of gate lines; and writing a data signal to the scanned sub-pixels.

Preferably, the method may further comprise: loading sequentially a common voltage to the common electrode lines arranged corresponding to each row of gate lines; and inversing the polarity of the common voltage, each time the scan signal is loaded to a row of gate lines.

Preferably, each time the scan signal is loaded to a row of gate lines, the polarity of the data signal may be inversed.

III. Beneficial Effects

According to the array substrate provided according to this disclosure, in a row of sub-pixels, sub-pixels in the odd columns and even columns are separately coupled to different gate lines, i.e., making the sub-pixels coupled to the same gate line are not adjacent to each other. In this way, during row scanning drive, an up-down twist charging may be implemented, and the sub-pixels cause no interference to each other. This prevents crosstalk, fundamentally solves the problem of Mura in the row inversion driving method, and achieves the objects of improving display effects of the display device and enhancing user experience.

BRIEF DESCRIPTION OF THE DRAWINGS

FIG. 4 is a schematic view of polarity changes of sub-pixels in a row inversion driving method according to an embodiment of the present invention.

Figures 1, 2:
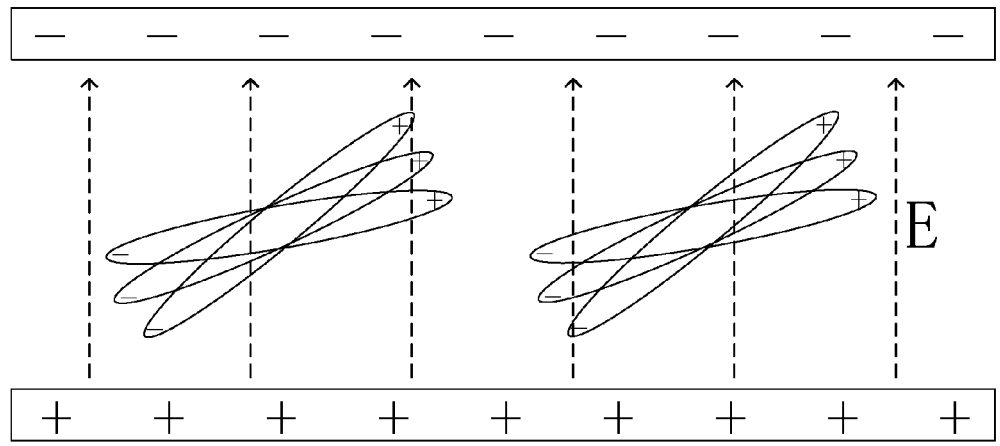
FIG. 1 is a schematic view of principles of polarization of liquid crystal molecules.
FIG. 2 is a schematic view of polarity changes of sub-pixels in a row inversion driving method in the prior art.

Reference numerals and denotations thereof: 1—gate line; 2—data line; 4—pixel electrode; 5—common electrode; 6—common electrode connection line; 7—thin film transistor.

DETAILED DESCRIPTION OF THE PREFERRED EMBODIMENTS

This disclosure is further described with reference to the drawings and exemplary embodiments. The following embodiments are merely for illustrating the present invention, rather than limiting the scope of the present invention.

Figure 3:
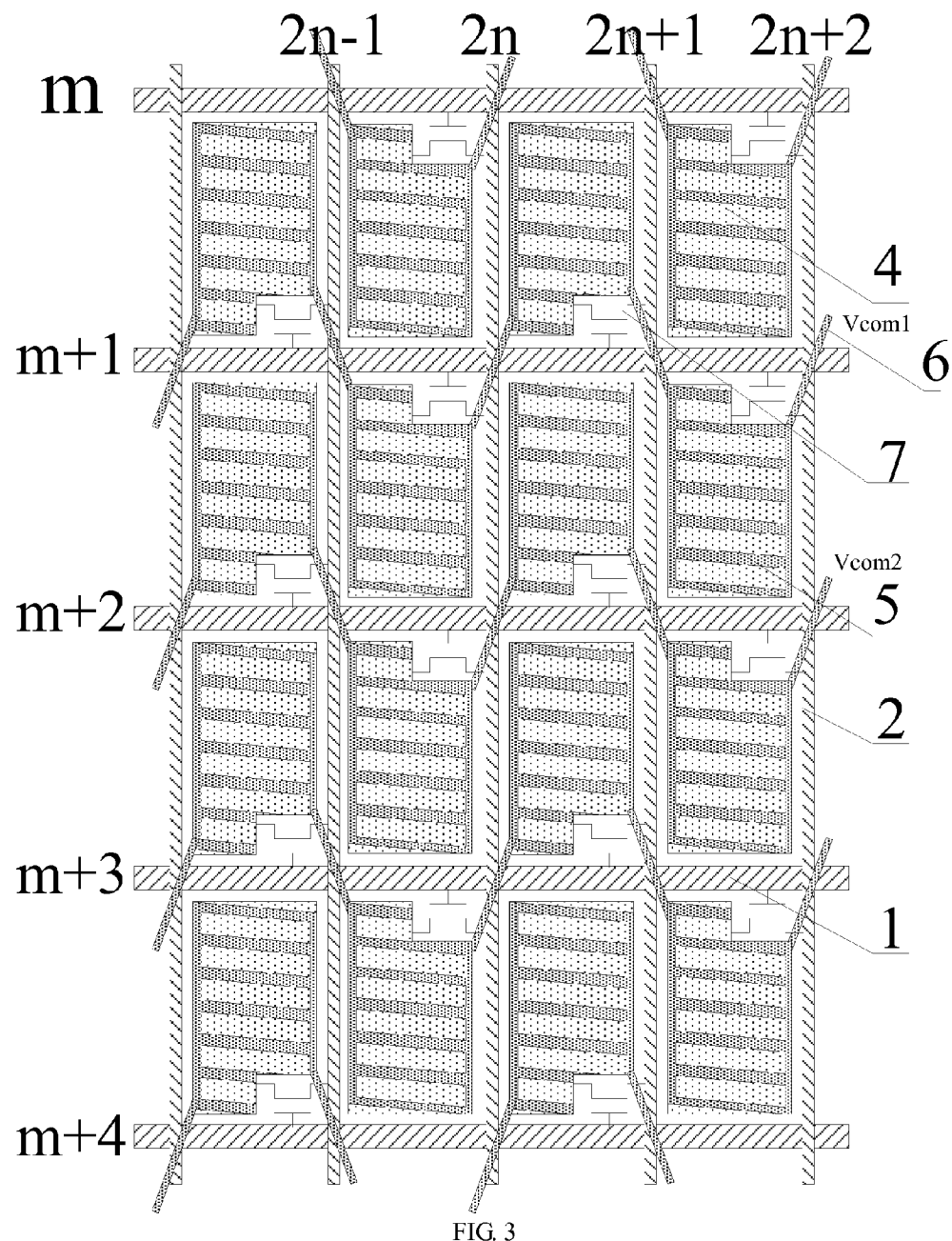
FIG. 3 is a schematic structural view of an array substrate according to an embodiment of the present invention.

As illustrated in FIG. 3, an embodiment of the present invention provides an array substrate; wherein the array substrate mainly comprises a substrate (not illustrated), gate lines 1 and data lines 2 are interleaved on the substrate. The gate lines 1 and the data lines 2 define pixel areas arranged in matrices. Each pixel area is provided with a sub-pixel. To be specific, a row of gate lines are arranged on two sides of each row of sub-pixels; and a column of data lines are arranged on two sides of each column of sub-pixels. The sub-pixels each mainly comprises a thin film transistor 7, a pixel electrode 4, and a common electrode 5. The thin film transistors 7 each comprises a gate electrode, a source electrode, and a drain electrode. The gate electrode of the thin film transistor 7 is coupled to the gate line 1; and a scan signal inputted via the gate line turns on and off the thin film transistor 7. The source electrode of the thin film transistor 7 is coupled to the data line 2; and the drain electrode is coupled to the pixel electrode 4. When the thin film transistor 7 is in the ON state, a data voltage on the data line 2 is applied to the pixel electrode 4, whereupon the data voltage applied to the pixel electrode 4 and the common voltage on the common electrode 5 form a drive electric field, which drives liquid crystal molecules to deflect at different degrees, thereby implement image display with different gray scales. A major improvement of the present invention lies in that, with respect to any of the plurality of rows of sub-pixels, sub-pixels in odd columns are all coupled to the gate line on one side of the row of sub-pixels; and sub-pixels in even columns are all coupled to the gate line on the other side of the row of sub-pixels (herein the terms "odd" and "even" are relatively defined, and are not limited in the present invention). And with respect to any two adjacent rows of sub-pixels, sub-pixels in the same column are coupled to different gate lines. Further, sub-pixels in any of rows of sub-pixels are coupled to different data lines. Further, sub-pixels in the same column are coupled to the same data line. For example, as illustrated in FIG. 3, with respect to the $m^{th}$ row of sub-pixels, sub-pixels in the $2n-1^{th}$ and $2n+1^{th}$ columns are all coupled to the $m+1^{th}$ row of gate lines, and sub-pixels in the $2n^{th}$ and $2n+2^{th}$ columns are all coupled to the $m^{th}$ row of gate lines. With respect to the $m+1^{th}$ row of sub-pixels, sub-pixels in the $2n-1^{th}$ and $2n+1^{th}$ columns are coupled to the $m+2^{th}$ row of gate lines, and sub-pixels in the $2n^{th}$ and $2n+2^{th}$ columns are all coupled to the $m+1^{th}$ row of gate lines (m and n are both an integer equal to and greater than 1). In this way, since the sub-pixels coupled to the same gate line are not adjacent to each other, during row scanning drive, an up-down twist charging may be implemented and the sub-pixels cause no interference to each other. This prevents crosstalk, fundamentally solves the problem of Mura in the row inversion driving method, and achieves the objects of improving display effects of the display device and enhancing user experience.

The row inversion driving method is generally implemented by inversing common voltages of each row of sub-pixels. To be specific, the polarity of the data voltage remains unchanged, whereas the common voltage is subject to alternate polarity changes, such that the data voltage is subject to positive-negative alternate changes with respect to the common voltage. In this way, since the polarity of the data voltage remains unchanged, the data voltage required may be greatly reduced, and thus power consumption may be lowered. During the row inversion drive, common voltages of the sub-pixels coupled to the same gate line need to simultaneously change. Therefore, in this embodiment, a common electrode line is arranged corresponding to each of the plurality of rows of gate line, wherein common electrodes of sub-pixels that are coupled to the same gate line are serially connected and then coupled to the common electrode line corresponding to the row of gate lines. For example, common voltage electrodes 5 of the sub-pixels coupled to the same gate line are serially connected and then coupled to the common electrode line via a common electrode connection line 6. That is, with respect to any two adjacent rows of sub-pixels, the common electrodes of sub-pixels in the odd columns but in the first row are serially connected to the common electrodes of sub-pixels in the even columns but in the second row; and the common electrodes of sub-pixels in the even columns but in the first row are serially connected to the common electrodes of sub-pixels in the odd columns but in the second row. Specifically, as illustrated in FIG. 3, for example, the common electrodes 5 of sub-pixels in the $m^{th}$ row and the $2n-1^{th}$ column, in the $m+1^{th}$ row and the $2n^{th}$ column, in the $m^{th}$ row and the $2n+1^{th}$ column, in the $m+1^{th}$ row and the $2n+2^{th}$ column are coupled via the common electrode line 6. In this way, the simultaneous change of the common voltages of the sub-pixels coupled to the $m+1^{th}$ gate line (m and n are both an integer equal to and greater than 1) may be easily achieved.

Further, the polarities of the common voltages on the common electrode lines corresponding to two adjacent rows of gate lines are opposite. For example, the common voltage on the common electrode line (Vcom1 illustrated in FIG. 3) corresponding to one row of gate lines is positive, and the common voltage on the common electrode line (Vcom2 illustrated in FIG. 3) corresponding to the other row of gate lines is negative. That is, the common voltage applied to the common electrode line arranged corresponding to each of the plurality of rows of gate lines is subject to alternate polarity change.

It should be understood that, the "polarity" of the voltage is not directly compared with a grounding voltage, but is defined for the common voltage with respect to the data voltage. For example, if the common voltage is in a positive polarity, the common voltage is greater than the data voltage; and if the common voltage is in a negative polarity, the common voltage is less than the data voltage. Analogously, the "polarity" of the data voltage is not directly compared with a grounding voltage either, but is defined for the data voltage with respect to the common voltage. The "polarity" of the sub-pixel is also defined for the common voltage of the sub-pixel with respect to the data voltage of the sub-pixel.

During image display, the data voltage applied to the pixel electrode 4 and the common voltage on the common electrode 5 form a drive electric field, which drives liquid crystal molecules to deflect at different degrees, thereby implement image display with different gray scales. However a parasitic capacitance exists between the common electrode 5 and the gate line 1, which exerts negative impacts on the drive electric field and thus causes image display distortion. Accordingly, when the pixel electrode and the common electrode are arranged on different layers, a favorable solution is to increase a thickness of the insulation layer between the common electrode 5 and the pixel electrode 4, so as to reduce the parasitic capacitance between the common electrode 5 and the gate line 1. However, in this way a pixel capacitance may be generated. That is, the capacitance formed between the pixel electrode 4 and the common electrode 5 is reduced and therefore a greater data voltage is needed. For example, in the prior art, the thickness of the insulation layer between the common electrode 5 and the pixel electrode 4 is typically 0.75 μm, the maximum data voltage needed is about 13 V. However, if the thickness of the insulation layer between the common electrode 5 and the pixel electrode 4 is increased to 1.5 μm, the maximum data voltage needed is about 25 V. With the increase of the data voltage, the probability of crosstalk between adjacent sub-pixels during the row inversion drive, i.e., the probability of the Mura phenomenon is significantly increased. However, if the array substrate according to this disclosure is employed, since the sub-pixels in the array substrate that are coupled to the same gate line impose no impact to each other, the probability of crosstalk between adjacent sub-pixels is eliminated. Therefore, the thickness of the insulation layer between the common electrode 5 and the pixel electrode 4 may be increased as required, for example, which may be increased to 2 μm or more. A great deal of practice has found that when the thickness of the insulation layer between the common electrode 5 and the pixel electrode 4 is 1.4 μm to 1.6 μm (for example, 1.5 μm), the parasitic capacitance between the common electrode 5 and the gate line 1 is reduced, image display distortion is mitigated, and the additionally applied data voltage falls within an acceptable range.

In this embodiment, the common electrode and the pixel electrode may be both plate electrodes (that is, the electrodes are in a plate shape with no opening), or comb electrodes (that is, having a specific slit (opening) or a distance between electrodes), as long as the common electrode and the pixel electrode form a drive electric field. Preferably, when the pixel electrode and the common electrode are arranged on different layers, either the common electrode or the pixel electrode is a comb electrode (that is, having a specific slit (opening) or a distance between electrodes). In this way, an electric field generated by the edge of the comb electrode and an electric field generated between the comb electrode and the plate electrode on the same plane form a multi-dimensional electric field, such that liquid crystal molecules in all alignments above the comb electrode and the plate electrode in a liquid crystal cell are capable of generating rotation, thereby improving liquid crystal working efficiency and greatly enhancing light transmittance efficiency.

Further, in this embodiment, in two adjacent rows of sub-pixels, the common electrodes of sub-pixels in the odd columns in one row are serially connected to the common electrodes of sub-pixels in the even column in the other row. In such up-down twist coupling manner, the common electrodes are serially connected only at the position where the sub-pixels are close to the row of gate lines (or the thin film transistors) to reduce the occupied pixel display area as much as possible. There is no need to arrange the common electrodes of the sub-pixels to traverse a sub-pixel middle area (i.e., the display area) to achieve serial connection, thereby preventing impacts on the transmittance rate and display effects.

Further, preferably during manufacture of the thin film transistor array substrate, the pixel electrodes are manufactured while forming the data lines; and the common electrodes are on the top layer. In this way, impacts caused by gate line and/or data line signals may be minimized when the common electrodes are serially connected and then applied with the common voltage (when the common electrodes are serially connected, the common electrodes are overlapped with the gate lines and data lines, and an insulation layer is arranged between the common electrodes and the data lines).

An embodiment of the present invention further provides a display device, wherein the display device mainly comprises a backlight module, a color filter substrate, the above-described array substrate, and other components. The array substrate is arranged opposite to the color filter substrate; and a liquid crystal layer is arranged between the array substrate and the color filter substrate; and the backlight module is configured to provide a light source for the display device. The display device further comprises a drive device coupled to the array substrate, wherein the drive device is mainly configured to provide a scan signal, a data voltage, a common voltage, and the like for the display device. For example, in this embodiment, the drive device comprises a gate electrode driver, a source electrode driver, a common electrode driver, and the like. The gate electrode driver is separately coupled to a plurality of rows of gate lines, and configured to sequentially load a scan signal to each of the plurality of rows of gate lines. The source electrode driver is separately coupled to a plurality of columns of data lines, and configured to load a data voltage to each of the plurality of columns of data lines. The common electrode driver is separately coupled to a plurality of common electrode lines, and configured to sequentially load a common voltage to each of the plurality of common electrode lines.

It may be understood that the common electrode driver may comprise a first common electrode driver and a second common electrode driver, wherein common electrode lines to which common voltages having the same polarity need to be applied are coupled to the same common electrode driver. For example, the first common electrode driver is coupled to common electrode lines to which a positive polarity common voltage needs to be applied; and the second common electrode driver is coupled to common electrode lines to which a negative polarity common voltage needs to be applied. Nevertheless, to enable the common electrode lines arranged corresponding to the plurality of rows of gate lines to alternate polarity change, the first common electrode driver and the second common electrode driver may be in alternate output and sequentially load a common voltage to each of the plurality of common electrode lines.

An embodiment of the present invention further provides a method for driving the above-described display device. The method mainly comprises: loading sequentially a scan signal to each of a plurality of rows of gate lines, so as to scan sub-pixels coupled to each of the plurality of rows of gate lines; and writing a data signal to the scanned sub-pixels; and loading sequentially a common voltage to each of a plurality of common electrode lines. To implement inverse drive, the common voltage or the data voltage may be subject to alternate change.

For example, with respect to the display device comprising the array substrate as illustrated in FIG. 3, the method may comprise:

loading sequentially a scan signal to each of a plurality of rows of gate lines, so as to scan sub-pixels coupled to each of the plurality of rows of gate lines; and writing a data signal to the scanned sub-pixels; and loading sequentially a common voltage to the scanned sub-pixels. Each time the scan signal is loaded to a row of gate lines, the polarity of the common voltage is reversed. To be specific, within a specific time period (for example, within a frame), the data voltage remains unchanged (or the polarity of the data voltage remains unchanged), a scan signal is loaded to the $m^{th}$ row of gate lines, and a thin film transistor 7 of sub-pixel in the $m_{th}$ row and the $2n^{th}$ column as well as a thin film transistor 7 of sub-pixel in the $m^{th}$ row and the $2n+2^{th}$ column are conducted.

A positive polarity common voltage is applied to the common electrode line coupled to the scanned sub-pixels, such that the positive polarity common voltage is applied to the common electrode of sub-pixel in the $m^{th}$ row and the $2n^{th}$ column as well as the common electrode of sub-pixel in the $m^{th}$ row and the $2n+2^{th}$ column.

A data voltage is applied to the data line coupled to the scanned sub-pixels, such that the data voltage is written into the sub-pixel in the $m^{th}$ row and the $2n^{th}$ column as well as the sub-pixel in the $m^{th}$ row and the $2n+2^{th}$ column.

A scan signal is loaded to the $m+1^{th}$ row of gate lines, such that the thin film transistors 7 of sub-pixels in the $m^{th}$ row and the $2n-1^{th}$ and $2n+1^{th}$ columns and the $m+1^{th}$ row and the $2n^{th}$ and $2n+2^{th}$ columns are conducted.

A negative polarity common voltage is applied to the common electrode line coupled to the scanned sub-pixels, such that the negative polarity common voltage is applied to the common electrodes of sub-pixels in the $m^{th}$ row and the $2n-1^{th}$ and $2n+1^{th}$ columns and the $m+1^{th}$ row and the $2n^{th}$ and $2n+2^{th}$ columns.

A data voltage is applied to the data line coupled to the scanned sub-pixels, such that the data voltage is written into sub-pixels in the $m^{th}$ row and the $2n-1^{th}$ and $2n+1^{th}$ columns and the $m+1^{th}$ row and the $2n^{th}$ and $2n+2^{th}$ columns.

A scan signal is loaded to the $m+2^{th}$ row of gate lines, such that the thin film transistors 7 of sub-pixels in the $m+1^{th}$ row and the $2n-1^{th}$ and $2n+1^{th}$ columns and the $m+2^{th}$ row and the $2n^{th}$ and $2n+2^{th}$ columns are conducted.

A positive polarity common voltage is applied to the common electrode line coupled to the scanned sub-pixels, such that the positive polarity common voltage is applied to the common electrodes of sub-pixels in the $m+1^{th}$ row and the $2n-1^{th}$ and $2n+1^{th}$ columns and the $m+2^{th}$ row and the $2n^{th}$ and $2n+2^{th}$ columns.

A data voltage is applied to the data line coupled to the scanned sub-pixels, such that the data voltage is written into sub-pixels in $m+1^{th}$ row and the $2n-1^{th}$ and $2n+1^{th}$ columns and the $m+2^{th}$ row and the $2n^{th}$ and $2n+2^{th}$ columns. The rest can be done in the same manner until all the sub-pixels are scanned.

According to the above-described row inversion driving method (i.e., common voltage row inversion driving method), the display device in this embodiment is driven. Polarity changes of respective sub-pixels are illustrated in FIG. 4. As a result, point inversion display effects are achieved, and the Mura phenomenon is prevented. In addition, compared with the point inversion driving method, the driving method in this embodiment is simpler to implement and has lower power consumption.

It may be understood that the method for loading the data voltage in the above-described embodiment may also be loading a data voltage to each of a plurality of columns of data lines when loading a scan signal to each of the plurality of rows of gate lines.

It should be noted that the display device according to this embodiment may also be driven in another row inversion driving method. For example, the polarity of the data voltage may be alternately changed, i.e., each time the scan signal is loaded to a row of gate lines, the polarity of the data voltage is reversed. However, in this way, the desired data voltage is too great, and consequently increases the power consumption. Nevertheless, the display device may also be driven in other driving methods, and is not limited to the driving methods exemplified in this embodiment.

In this embodiment, the data signal written into the sub-pixel is described by using the data voltage as an example. However, a person skilled in the art should understand that the data signal is not limited to the voltage signal. Any other signals that are capable of inversing a polarity may be used.

The embodiments described above are merely for illustrating the present invention, and are not intended to limit the present invention. Persons of ordinary skill in the art may derive various changes and variations without departing from the spirit and scope of the present invention. Such equivalent technical solutions shall fall into the protection scope of the present invention.

What is claimed is:

1. An array substrate, at least comprising a plurality of rows of sub-pixels, a plurality of gate lines and a plurality of data lines arranged about the plurality of rows of sub-pixels, the plurality of gate lines and the plurality of data lines intersecting to define a plurality of sub-pixel areas, each sub-pixel area containing a respective one of the sub-pixels; wherein:

with respect to any row of the sub-pixels, sub-pixels in odd columns are all coupled to the gate line on one side of the row of sub-pixels, and sub-pixels in even columns are all coupled to the gate line on the other side of the row of sub-pixels; and with respect to any two adjacent rows of sub-pixels, sub-pixels in the same column are coupled to different gate lines, wherein the array substrate further comprises common electrodes arranged corresponding to each row of gate lines, with respect to any two adjacent rows of sub-pixels, the common electrodes of sub-pixels in the odd columns in the first row are serially connected to the common electrodes of sub-pixels in the even columns in the second row via a same common electrode connection line, such that the common electrodes of the sub-pixels are serially connected only at the position where the sub-pixels are close to the corresponding row of gate lines, the same common electrode connection line extending diagonally between and connecting sub-pixels in the odd columns in the first row and sub-pixels in the even column in the second row, without going through sub-pixel areas in the odd columns in the second row and sub-pixel areas in the even columns in the first row;

wherein the sub-pixels each further comprises pixel electrodes that are arranged on a layer different from the layer where the common electrodes are arranged;

wherein an insulation layer having a thickness ranging from 1.4 µm to 1.6 µm is arranged between the pixel electrodes and the common electrodes.

2. The array substrate according to claim 1, wherein:
at least one of the common electrode and the pixel electrode is a comb electrode.

3. The array substrate according to claim 1, wherein the thickness of the insulation layer is such that a value of parasitic capacitance between each of the common electrodes and a corresponding gate line is reduced, while an applied data voltage falls within an acceptable range.

4. The array substrate according to claim 1, wherein the thickness of the insulation layer is such that a value of parasitic capacitance between each of the common electrodes and a corresponding gate line is small, while an applied data voltage falls within an acceptable range and reducing occurrences of crosstalk between adjacent sub-pixels during a row inversion drive.

5. A display device, comprising an array substrate, which at least comprises a plurality of rows of sub-pixels, a plurality of gate lines and a plurality of data lines arranged about the plurality of rows of sub-pixels, the plurality of gate lines and the plurality of data lines intersecting to define a plurality of sub-pixel areas, each sub-pixel area containing a respective one of the sub-pixels; wherein:

with respect to any row of the sub-pixels, sub-pixels in odd columns are all coupled to the gate line on one side of the row of sub-pixels, and sub-pixels in even columns are all coupled to the gate line on the other side of the row of sub-pixels; and with respect to any two adjacent rows of sub-pixels, sub-pixels in the same column are coupled to different gate lines, wherein the array substrate further comprises common electrodes arranged corresponding to each row of gate lines, with respect to any two adjacent rows of sub-pixels, the common electrodes of sub-pixels in the odd columns in the first row are serially connected to the common electrodes of sub-pixels in the even columns in the second row via a same common electrode connection line such that the common electrodes of the sub-pixels are serially connected only at the position where the sub-pixels are close to the corresponding row of gate lines, the same common electrode connection line extending diagonally between and connecting sub-pixels in the odd columns in the first row and sub-pixels in the even column in the first row, without going through sub-pixel areas in the odd columns in the second row and sub-pixel areas in the even columns in the first row;

wherein the sub-pixels each further comprises pixel electrodes that are arranged on a layer different from the layer where the common electrodes are arranged;

wherein an insulation layer having a thickness ranging from 1.4 µm to 1.6 µm is arranged between the pixel electrodes and the common electrodes.

6. The display device according to claim 5, further comprising:
a drive device coupled to the array substrate.

7. The display device according to claim 6 wherein:
the array substrate further comprises: data lines arranged on two sides of each column of sub-pixels;
wherein the drive device comprises:
a gate electrode driver, coupled to the gate lines and configured to sequentially load a scan signal to each row of gate lines;
a source electrode driver, coupled to the data lines and configured to load a data signal to the data lines; and
a common electrode driver, coupled to the common electrode lines and configured to sequentially load a common voltage to the common electrode lines arranged corresponding to each row of gate lines.

8. The display device according to claim 5, wherein:
at least one of the common electrode and the pixel electrode is a comb electrode.

9. The display device according to claim 5, wherein the thickness of the insulation layer is such that a value of parasitic capacitance between each of the common electrodes and a corresponding gate line is reduced, while an applied data voltage falls within an acceptable range.

10. The display device according to claim 5, wherein the thickness of the insulation layer is such that a value of parasitic capacitance between each of the common electrodes and a corresponding gate line is small, while an applied data voltage falls within an acceptable range and reducing occurrences of crosstalk between adjacent sub-pixels during a row inversion drive.

11. A method for driving a display device that comprises an array substrate, wherein the array substrate at least comprises a plurality of rows of sub-pixels, a plurality of gate lines and a plurality of data lines arranged about the plurality of rows of sub-pixels, the plurality of gate lines and the plurality of data lines intersecting to define a plurality of sub-pixel areas, and each sub-pixel area containing one of the sub-pixels; wherein:

with respect to any row of the sub-pixels, sub-pixels in odd columns are all coupled to the gate line on one side of the row of sub-pixels, and sub-pixels in even columns are all coupled to the gate line on the other side of the row of the sub-pixels; and with respect to any two adjacent rows of sub-pixels, sub-pixels in the same column are coupled to different gate lines, wherein the array substrate further comprises common electrodes arranged corresponding to each row of gate lines, with respect to any two adjacent rows of sub-pixels, the common electrodes of sub-pixels in the odd columns in the first row are serially connected to the common electrodes of sub-pixels in the even columns in the second row via a same common electrode connection line, such that the common electrodes of the sub-pixels are serially connected only at the position where the sub-pixels are close to the corresponding row of gate lines, the same common electrode connection line extending diagonally between and connecting sub-pixels in the odd columns in the first row and sub-pixels in the even column in the second row, without going through sub-pixel areas in the odd columns in the second row and sub-pixel areas in the even columns in the first row;

wherein the sub-pixels each further comprises pixel electrodes that are arranged on a layer different from the layer where the common electrodes are arranged;

wherein an insulation layer having a thickness ranging from 1.4 μm to 1.6 μm is arranged between the pixel electrodes and the common electrodes; and the method comprising:
loading sequentially a scan signal to each row of gate lines, so as to scan sub-pixels coupled to each row of gate lines; and
writing a data signal to the scanned sub-pixels.

12. The method according to claim 11, further comprising:
loading sequentially a common voltage to the common electrode lines arranged corresponding to each row of gate lines; and
inversing the polarity of the common voltage, each time the scan signal is loaded to a row of gate lines.

13. The method according to claim 11, further comprising:
inversing the polarity of the data signal, each time the scan signal is loaded to a row of gate lines.

14. The method according to claim 11, wherein the thickness of the insulation layer is such that a value of parasitic capacitance between each of the common electrodes and a corresponding gate line is reduced, while an applied data voltage falls within an acceptable range.

15. The method according to claim 11, wherein the thickness of the insulation layer is such that a value of parasitic capacitance between each of the common electrodes and a corresponding gate line is small, while an applied data voltage falls within an acceptable range and reducing occurrences of crosstalk between adjacent sub-pixels during a row inversion drive.

* * * * *